United States Patent [19]

Smith et al.

[11] Patent Number: 5,263,694
[45] Date of Patent: Nov. 23, 1993

[54] UPPER MOUNT ASSEMBLY FOR A SUSPENSION DAMPER

[75] Inventors: Stanley E. Smith; Richard E. Longhouse; Wendell Collins, Jr.; Eric L. Jensen, all of Dayton, Ohio

[73] Assignee: General Motors Corporation, Detroit, Mich.

[21] Appl. No.: 840,473

[22] Filed: Feb. 24, 1992

[51] Int. Cl.$^5$ ............................................. F16F 3/10
[52] U.S. Cl. ............................ 267/220; 267/33; 267/162; 280/668
[58] Field of Search ............... 267/33, 162, 220, 221, 267/225; 188/321.11; 280/668, 692, 696, 697

[56] References Cited

U.S. PATENT DOCUMENTS

| | | | |
|---|---|---|---|
| 4,274,655 | 6/1981 | Ledeman | 267/221 |
| 4,434,977 | 3/1984 | Chiba et al. | 267/152 |
| 4,568,067 | 2/1986 | Iwata | 267/28 |
| 4,625,847 | 12/1986 | Maucher | 267/158 |
| 4,773,635 | 9/1988 | Buma | 267/220 |
| 4,804,169 | 2/1989 | Hassan | 280/668 |
| 4,968,010 | 11/1990 | Odobasic | 267/162 |
| 4,984,777 | 1/1991 | Kurr et al. | 267/162 |
| 5,150,886 | 9/1992 | Hamberg et al. | 267/220 |

FOREIGN PATENT DOCUMENTS

| | | | |
|---|---|---|---|
| 3636482 | 4/1988 | Fed. Rep. of Germany | 267/220 |
| 0050803 | 3/1984 | Japan | 267/220 |
| 0848795 | 7/1981 | U.S.S.R. | 267/162 |

OTHER PUBLICATIONS

Steven Basic, Omega Components, Erie, Pa. 18-page, undated article describing and illustrating an "integrated spring damper".

Steven Basic, two-page, undated article titled, "Embedded Washers Absorb Shock, Vibration," describing and illustrating an integrated spring damper.

Primary Examiner—Robert J. Oberleitner
Assistant Examiner—Chris Schwartz
Attorney, Agent, or Firm—A. M. Tucker

[57] ABSTRACT

An upper mount assembly includes a pair of plates seating at least one Belleville spring. The plates are concentrically mounted about a hydraulic damper so that the Belleville spring is in series with a coil suspension spring. During use, deflection of the Belleville spring provides an additional degree of motion to reduce transmission of vibration to the vehicular body.

5 Claims, 2 Drawing Sheets 5,263,694

UPPER MOUNT ASSEMBLY FOR A SUSPENSION DAMPER

CROSS-REFERENCE TO RELATED APPLICATION

The present invention is related to the invention of application Ser. No. 07/751,925, filed Sep. 3, 1991, issued as U.S. Pat. No. 5,150,886 on Sep. 29, 1992.

BACKGROUND OF THE INVENTION

1. Field of the Invention

The present invention relates generally to mounting assemblies for hydraulic dampers used in vehicular suspension systems. In particular, the present invention is concerned with at least one Belleville spring incorporated in an upper mount assembly to reduce ride harshness and vibration transmission from a damper.

2. Description of the Related Art

Conventional upper mount assemblies include at least one resilient element (usually formed from rubber) to isolate and reduce transmission of road inputs to a vehicular body from a damper. An upper mount must be firm enough to support and maintain the weight of the vehicle and simultaneously be resilient enough to isolate road inputs. To reduce impact harshness, it is desirable to permit the deflection of an upper mount during an operational range of the damper, thereby reducing vibrations transferred to the body. When high loads are incurred, the upper mount preferably resists deflection.

A single path top mount utilizes a single pad of rubber to accommodate the forces generated by a damper and a cooperating coil spring. A dual rate top mount includes a single rubber pad having different spring rates for the coil spring and the actuator. A dual path strut mount has two separate rubber pads, one to carry forces generated by the coil spring and one to receive forces from the actuator. The dual rate and dual path top mounts offer improvements over a single path top mount which provides a compromised spring rate to accommodate the two different forces. These types of conventional top mounts produce substantially linear load deflection curves.

It is desirable to permit axial stroke in a mounting assembly without transferring a load to the vehicular body. Also, due to space restrictions in a wheel well, it is desirable that a mount assembly permit relatively large deflection for a relatively small diameter.

SUMMARY OF THE INVENTION

The present invention includes an upper mount assembly for securing an upper end of a hydraulic damper of a vehicular suspension system to a body. The upper mount assembly includes at least one Belleville spring mounted in series with a suspension spring to permit deflection of the assembly during the operational range of the damper. The assembly achieves an S-shaped load deflection curve as opposed to a substantially linear curve for conventional upper mount assemblies. When the assembly operates in the "flat" portion of the S-shaped curve, vibration transmissions and ride harshness are reduced.

An upper mount assembly includes a pair of plates seating at least one Belleville spring. The plates are concentrically mounted about a hydraulic damper so that the Belleville spring is in series with a coil suspension spring. During use, deflection of the Belleville spring provides an additional degree of motion to reduce transmission of vibration to the vehicular body.

DETAILED DESCRIPTION OF THE PREFERRED EMBODIMENT

Figure 1:
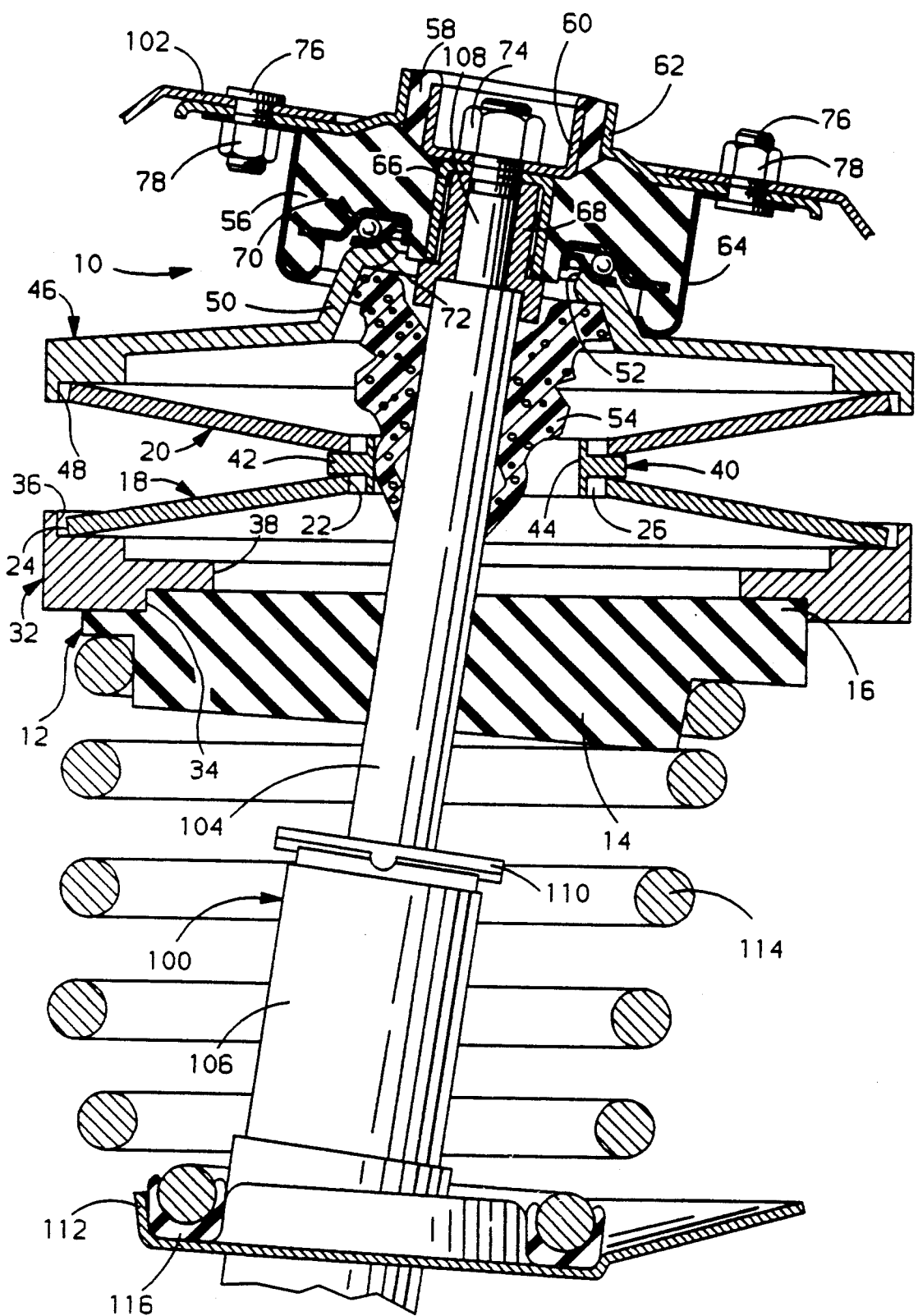
FIG. 1 is a sectional view of a preferred embodiment of the present upper mount assembly used to attach an upper end of a partially illustrated hydraulic damper to a vehicular body.

An upper mount assembly indicated generally at 10 is illustrated in FIG. 1. The upper mount assembly 10 attaches a hydraulic damper 100 (e.g., a strut or shock absorber) to a mounting tower 102 formed in a wheel well of a vehicular body. The lower end of the damper 100 (not illustrated) is attached to a steerable wheel assembly by any suitable manner.

The damper 100 includes a reciprocable piston rod 104 extending from an upper end of a reservoir tube 106. A well-known valved piston is mounted to a lower end of the piston rod 104 in a fluid-filled cylinder (not illustrated) housed by the damper 100. The piston rod 104 preferably terminates in a reduced-diameter threaded portion 108. A bump plate 110 having a central opening for receiving the piston rod 104 is secured to the upper end of the reservoir tube 106.

A lower spring seat 112 is secured to an intermediate portion of the reservoir tube 106 by any suitable means. A helical or coil suspension spring 114 is seated at its lower end on the lower spring seat 112 and spirals upwardly around the damper 100. Preferably, an elastomeric insulator 116 is provided between the lower coil of the suspension spring 114 and the lower spring seat 112. The upper end of the suspension spring 114 engages the upper mount assembly 10 as described below. With the suspension spring 114 operatively mounted between the lower spring seat 112 and the upper mount assembly 10, the vehicle body is resiliently supported or suspended so that road inputs (bumps, roadway irregularities, etc.) encountered by the wheel assembly do not detract from the ride.

The mounting assembly 10 preferably includes an elastomeric insulator 12 in seating engagement with an upper end of the suspension spring 114. The insulator 12 includes a downwardly projecting flange 14 on a lower surface which is sized to seat the upper coil of the suspension spring 114. An upwardly projecting flange 16 is provided on an upper surface of the insulator 12. If desired, the insulator 12 can include reinforcing elements (not illustrated) embedded in the elastomeric material.

Figure 2:
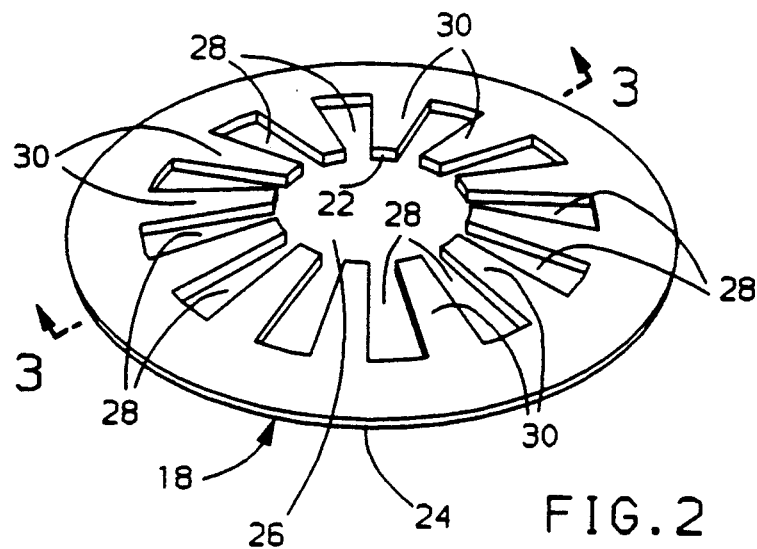
FIG. 2 is a perspective view of one of the Belleville springs used in the upper mount assembly of FIG. 1.
Figure 3:
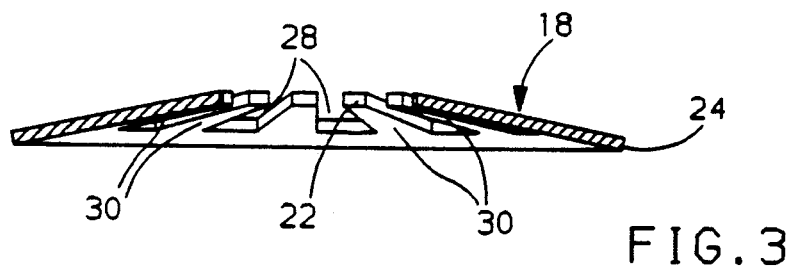
FIG. 3 is a sectional view taken along line 3—3 of FIG. 2.

In the embodiment illustrated in FIG. 1, a pair of Belleville springs 18,20 are mounted in series with the suspension spring 114 to provide an additional spring force as described below. Each Belleville spring 18,20 is a substantially dished element which acts as a springable annular disc. For purposes of clarity of illustration, the lower Belleville spring 18 has been removed from the upper mount assembly 10 in FIGS. 2 and 3. The Belleville spring 18 includes inner and outer peripheral edges 22 and 24 and a central opening 26. If desired, radial slots 28 can be formed from the inner peripheral edge 22 so that a plurality of flexible fingers 30 point radially inwardly to the central opening 26 which receives the piston rod 104 when assembled in the mounting assembly 10 as illustrated in FIG. 1. Other constructions of Belleville springs 18,20 are within the scope of this invention. Upper Belleville spring 20 can also be slotted if desired, and one or both of the Belleville springs 18,20 can be unslotted.

A lower plate 32 includes a recessed cavity 34 in its lower surface for receiving the upwardly projecting flange 16 so that the lower plate 32 is seated on the insulator 12. A recessed cavity 36 in the upper surface of the lower plate 32 is sized to receive and seat the outer peripheral edge 24 of the lower Belleville spring 18. A central opening 38 in the lower plate 32 receives the upwardly projecting piston rod 104.

An annular spacer 40 can be inserted between the Belleville springs 18,20. The spacer 40 includes an annular flange 42 on its outer circumference. The inner peripheral edge 22 of the lower Belleville spring 18 rests against a lower surface of the flange 42 while the inner peripheral edge of the upper Belleville spring 20 rests against an upper surface of the flange 42. A central opening 44 in the spacer 40 receives the upwardly projecting piston rod 104.

An upper plate 46 includes a recessed cavity 48 in its lower surface for receiving and seating the outer peripheral edge of the upper Belleville spring 20. A generally conical dome 50 is formed in an upper surface of the upper plate 46. A central opening 52 in the dome 50 receives the piston rod 104. A resilient jounce bumper 54 is fitted over the piston rod 104 and secured to an inner surface of the dome 50 by any suitable means. The jounce bumper 54 collapsibly engages the bump plate 110 during a severe compression stroke as the piston rod 104 slides into the reservoir tube 106.

First and second annular resilient isolators 56,58 formed from a suitable elastomeric material are sandwiched between a retainer cup 60 and upper and lower sheet metal retainers 62,64 that have outwardly extending flange portions. An inverted cup 66 is embedded in the first isolator 56. A tubular adapter bushing 68 is fitted on the threaded portion 108 of the piston rod 104 and projects upwardly into a central opening in the first isolator 56. A bearing assembly 70 includes a plurality of ball bearings 72 fitted between an upper race engaged against the first isolator 56 and a lower race supported on an upper surface of the dome 50. The retainer cup 60 includes a central opening for receiving the threaded portion 108 of the piston rod 104. A nut 74 is threaded on the threaded portion 108 to secure the retainer cup 60, isolators 56,58, bearing assembly 70 and plates 32,46 to the piston rod 104. A plurality of fasteners 76 and corresponding nuts 78 are used to secure the upper mount assembly 10 to the body 102.

When the upper mount assembly 10 is assembled on a vehicle, the weight of the vehicle preloads the Belleville springs 18,20 and the suspension spring 114. As the reservoir tube 106 moves upwardly due to road inputs, the suspension spring 114 is compressed, thereby increasing the force imparted to the Belleville springs 18,20 and causing them to deflect. This deflection provides an additional degree of motion to reduce transmission of vibration to the body 102, thereby reducing ride harshness experienced in conventional upper mount assemblies. When the upward force is removed, the Belleville springs 18,20 return to their original positions.

It is appreciated that other patterns of Belleville springs can be used with the present upper mount assembly 10. For example, only one Belleville spring can be fitted between the plates 32,46. Additionally, while the Belleville springs 18,20 are mounted in series with respect to each other in FIG. 1, the springs 18,20 can be mounted in parallel with respect to each other by stacking the springs 18,20. Depending upon mounting and space limitations, other patterns of singular and multiple Belleville spring patterns can be envisioned. In other embodiments, Belleville springs may be mounted between the suspension spring 114 and the lower seat 112, either alone or with Belleville springs mounted at the upper end of the suspension spring 114.

Figure 4:
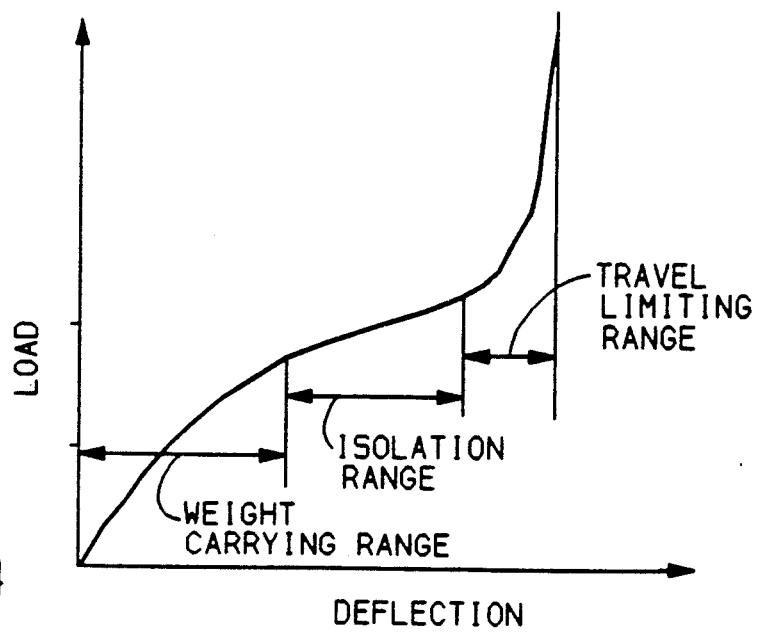
FIG. 4 is a graph illustrating a load deflection curve achieved by the present upper mount assembly.

FIG. 4 is a graph illustrating a typical load deflection curve for the present mount assembly 10 and suspension spring 114. When the upper mount assembly 10 functions in the isolation range (i.e., the "flat" portion of the curve), the Belleville springs 18, 20 provide an extra range of deflection not present in conventional spring and upper mount assemblies. The extra deflection reduces vibration transmissions to the body 102, thereby reducing ride harshness.

Although the present invention has been described with reference to a preferred embodiment, workers skilled in the art will recognize that changes may be made in form and detail without departing from the spirit and scope of the invention.

The embodiment of the invention in which an exclusive property or privilege is claimed are defined as follows:

1. An upper mount assembly for attaching a hydraulic strut to a vehicular body, wherein the strut supports a suspension spring, the upper mount assembly comprising:
   (a) an insulator supported by an upper end of the suspension spring;
   (b) a lower plate seated on the insulator;
   (c) a first Belleville spring seated on an upper surface of the lower plate;
   (d) a spacer having an annular flange with upper and lower surfaces, wherein the flange lower surface is seated on the first Belleville spring;
   (e) a second Belleville spring seated on the flange upper surface of the spacer;
   (f) an upper plate seated on the second Belleville spring;
   (g) a bearing assembly including roller bearings seated on an upper surface of the upper plate; and
   (h) resilient isolator means seated on the bearing assembly, the isolator means including retainers to contain elastomeric isolators and means for attaching the isolator means to the vehicular body.

2. The upper mount assembly specified in claim 1 wherein the insulator includes a downwardly projecting flange seating the upper end of the suspension spring.

3. The upper mount assembly specified in claim 1 wherein:
   (a) a recess is provided in an upper surface of the lower plate for seating the first Belleville spring; and
   (b) a recess is provided in a lower surface of the upper plate for seating the second Belleville spring.

4. The system specified in claim 1 wherein the lower plate includes a recess in a lower surface for seating the insulator.

5. The system specified in claim 1 wherein the Belleville springs are slotted.

* * * * *